United States Patent Office 2,702,425
Patented Feb. 22, 1955

2,702,425

BONDING MATERIALS AND METHOD OF MAKING THE SAME

John S. Thompson, Detroit, Mich., assignor, by mesne assignments, to Parker Rust Proof Company, a corporation of Michigan No Drawing. Application April 13, 1951,
Serial No. 220,973

14 Claims. (Cl. 25—156)

The invention relates to bonding materials and to a method for making and using the same. More particularly, this invention relates to phosphate bonding materials which are useful as binders for metal powders, metallic oxides, etc. and applications in various industrial fields. This is a continuation-in-part of my copending application Serial No. 538,327, now abandoned, filed June 1, 1944.

Heretofore, oxyphosphate bonding agents have been widely used in industry in the manufacture of refractories and insulation material and for other purposes. In general, these agents have been produced by reacting phosphoric acid or an acid salt of phosphoric acid with one of the following substances or an oxide thereof in the presence of water: lithium, potassium, sodium, ammonium, beryllium, magnesium, calcium, tin, lead, cobalt, nickel, strontium, aluminum, zinc, manganese, iron, copper, silicon, zirconium, thorium, molybdenum, tungsten, titanium, and mercury.

It has been proposed in British Patent No. 521,694 to produce porous filter blocks by reacting commercial aqueous phosphoric acid with metallic oxides or metallic hydrates of aluminum, iron, and magnesium. It is suggested that the phosphoric acid used may be commercial aqueous phosphoric acid or may be formed by the combination of water from the metallic hydrates with the dehydration products of phosphoric acid. It is said that the metallic oxide or hydrate, as the case may be, combines with the phosphoric acid to form a metallic phosphate which may be subsequently cold pressed into the desired shape or fabricated into the form of granules. In either case, it is necessary to dehydrate or "activate" the material in order to obtain the desired porosity, and it is apparent that water which is capable of being separated therefrom by heating must be present in the "unactivated" material.

British Patent No. 326,825 proposes the production of molded articles by combining salts of heavy metals containing water of crystallization with alkaline earth metal compounds in pulverulent form such as plaster of Paris, zinc sulfate, magnesia, etc. Heavy metal salts such as the phosphates of iron, zinc, manganese, and copper containing water of crystallization are referred to, which, in combination with plaster of Paris or the like, set by the mechanism of an interchange of water of crystallization. Such cements are commonly referred to as hydraulic cements. Particular reference is made to the fact that additional water is not added to the ingredients; it is apparent that the absence of additional liquid water does not change the reaction mechanism since sufficient water is present as water of crystallization.

When molding the hitherto known oxyphosphate cements under the simultaneous application of heat and pressure, it is particularly difficult, if not completely impossible to avoid incomplete curing, the formation of cracks and fissures, or other injurious effects caused by escaping steam when the pressure is decreased even though the cement has been dried before molding. While a moldable porous product may be obtained in the presence of water by cold pressing and subsequent heating, such a product is a distinctly different type of product than the improved product of this invention.

I have now found that the presence of any water in a reaction mixture comprising an acidic phosphate and a metallic oxide is detrimental to the production of a sound, hard, imporous, wear-resistant, molded product wherein the ingredients undergo a chemical reaction as distinguished from a hydraulic reaction.

Accordingly, the principal objects of this invention are to provide a phosphate bonding material that is free of water which may be hot molded by the simultaneous application of heat and pressure and with a chemical reaction will produce a sound, hard, imporous, wear-resistant, set material which will retain its rigidity to a much higher temperature than that at which it is originally molded; to provide a method for producing dry, transportable bonding material having storage stability in the form of granules or powder which is suitable for molding under heat and pressure into articles of the desired shape; and, in general, to provide an improved phosphate cement which overcomes the deficiencies of the hitherto known oxyphosphate cements. This invention is not directed to the combination of an acidic phosphate with a metallic oxide in the presence of water or to the molding of phosphates per se since they are hereinbefore acknowledged to be old. Contrariwise, my invention is directed to the unexpectedly superior product which is obtained when known chemically reactive materials are reacted in the absence of water and to the method for making and using the same.

There are a number of ways in which the invention may be carried out, but the general principle is to chemically react anhydrous phosphoric acid with a completely dry metallic oxide under controlled conditions such that a partially chemically reacted molding material is obtained. This molding material may be suitably sized and prepared for shipment or storage, and thereafter used for molding a variety of heat-resistant, hard, sound, imporous parts by subjecting the material to the simultaneous application of heat and pressure. The application of heat and pressure causes the partially chemically reacted material to assume a sound form through the mechanism of further chemical reaction. While it is not my wish to be limited by any particular theory, it is my belief that the partial chemical reaction obtained by mixing and heating at a low temperature produces a metallic phosphate which is capable of polymerizing under the application of heat and pressure to a heat set material. The further chemical reaction referred to above is believed to be analogous to polymerization in all respects.

According to the invention, oxides of metals such as aluminum, iron, manganese, titanium, chromium, etc. may be used, and I may equally satisfactorily employ metallic oxides that will chemically react with an anhydrous acid containing phosphorus in the acid radical in the absence of water, care being taken, however, not to select an oxide which is highly reactive at room temperature, such as $Fe_3O_4$, $MgO$, etc.

To the selected oxide I add an anhydrous acid containing phosphorus in the acid radical that will cause a partial chemical reaction only upon mixing and a further complete chemical reaction upon the application of heat and pressure. For this purpose, I have found that the particular acid required may depend upon the nature of the dry oxide powder which is being used and is related to the treatment intended, but in all cases an anhydrous acid in the range of $H_3PO_4$ to $H_4P_2O_7$, inclusive, has been found satisfactory. Phosphorus containing acids in which the phosphorus occurs in valence states other than pentavalent have not been found to be suitable. With some basic powders, the action of anhydrous ortho-phosphoric acid alone is not entirely satisfactory. Pyrophosphoric acid has been found to react better and form a harder product with some oxide powders than does ortho-phosphoric acid although at normal temperatures the ortho-phosphoric acid is frequently more reactive than the pyrophosphoric acid. In the majority of cases, it has been found that an acid which corresponds approximately to an equal mixture by weight of $H_3PO_4$ and $H_4P_2O_7$ is preferred. Meta-phosphoric acid, which occurs as a solid at room temperature, is hygroscopic and difficult to obtain in uniform admixture with metallic oxides, and the resulting product is somewhat inferior to the product of this invention. For this practical reason, only, meta-phosphoric acid is not recommended. The mixture of acids between $H_3PO_4$ and $H_4P_2O_7$ may be prepared by heating ordinary ortho-phosphoric acid until it corresponds with the desired formula; by combining $P_2O_5$ with $H_3PO_4$; by adding water to tetraphosphoric acid; by combining $P_2O_5$ in the proper proportions with water in any convenient manner; or by mixing the desired proportions of $H_3PO_4$ and $H_4P_2O_7$.

By way of example only, the method of the invention will now be described wherein ignited alumina is the dry metallic oxide.

Ignited alumina in powdered form is intimately mixed with the selected anhydrous phosphoric acid. Mixing may be accomplished by any suitable means, but I have found that satisfactory mixing is obtained in 15 minutes to one hour in a Muller mixer, Hobart mixer, or by the use of differential rolls, or the like. The specific size of the particles of dry oxide is not critical and may vary between about 60 screen mesh to —300 mesh, and the amount of acid and oxide used may likewise vary over wide ranges depending on the use for which the bonding material is intended. For example, satisfactory bonding materials are obtained by using from about 25 percent to about 70 percent of anhydrous phosphoric acid by weight of the dry oxide; in no case should acid in excess of the stoichiometric proportion to form normal aluminum phosphate be added to the selected oxide. The mixture is subjected to a temperature of approximately 250° F. to 300° F. for approximately 10 minutes to 30 minutes to effect partial chemical reaction. The chemical reaction is then interrupted by decreasing the temperature or completely cooling the mixture which at this point may be in the form of small granules or a solid sheet or an intermediate form between these two depending upon the amount of acid which is used. If the material is in the form of a sheet or very large aggregates, it may readily be broken up into small aggregates of the desired size for molding, or the mixture may be ground up by hammer milling or the like to produce a molding powder having any particular desired particle size. For this purpose, it has been found desirable to dust the aggregates before grinding with magnesium oxide, magnesium carbonate, or the like in an amount between about 2 percent to 5 percent by weight of the mixture to facilitate grinding as well as to contribute to storage stability. Dusted powder or aggregates have been found to be stable for periods exceeding 4 years and yet remain readily deformable under pressure and capable of being heat set.

To more clearly illustrate the procedure described above, the following examples may be mentioned:

Example 1

15 pounds of ignited alumina having a particle size of —300 mesh was admixed with 4 pounds of anhydrous phosphoric acid obtained by mixing equal parts by weight of $H_3PO_4$ and $H_4P_2O_7$. Mixing was done in a Muller mixer for 30 minutes. The mixture was then heated for 15 minutes at 260° F. in an oven and then removed and allowed to cool in air. After cooling, the partially reacted mass was in the form of small aggregates or granules. One part by weight of magnesium oxide to 32 parts by weight of the aggregate was added and the mixture subjected to hammer milling. The resulting powder had a particle size of less than 100 mesh, and the majority of the particles were less than 200 mesh. The powder was not tacky and had no tendency to absorb moisture on storage. Approximately 30 grams of this powder was then placed in a 1 inch by 2 inch die and subjected to a pressure of approximately 30 tons per square inch while concurrently increasing the temperature from room temperature to 300° F. in 20 minutes. The molded piece was sound and had a glazed surface. This piece was then taken to a final temperature of 1650° F. in a Muffle furnace and removed. The resulting piece after heat treatment was sound, imporous, and had a Rockwell A hardness of approximately 80.

Example 2

In general, the procedure of Example 1 was followed on a mixture of 180 grams of ignited alumina and 50 grams of the same acid. The mixture was subjected to a temperature of 300° F. for 10 minutes, and the pressed and heat treated product obtained was similar to that of Example 1.

The foregoing general method is applicable to the combination of anhydrous phosphoric acid with any of the above mentioned oxides, and my invention contemplates not only the use of a single one of these oxides but admixtures of several of them. In the case of iron oxide, I have found that $Fe_3O_4$ is somewhat difficult to mix, and $Fe_2O_3$ is preferred.

The selection of the particular oxide to be used will depend upon the purpose for which the bonding material is intended and the following general characteristics of the molded material are offered by way of guidance in the selection of the desired oxide:

| | Relative Hardness | Color | Relative Rate of Chemical Reactivity of the Oxides |
|---|---|---|---|
| Aluminum oxide | Hard | White | Fast. |
| Ferric oxide | Soft | Reddish brown | Fast. |
| Titanium oxide | Soft | White | Slow. |
| Chromium oxide | Soft | Green | Slow. |
| Manganese dioxide | Soft | Black | Slow. |

The above chart sets forth the relationships of the various oxides on a comparative basis. The relationships are general and will apply only as a guide when comparing approximately equivalent concentrations of acid and oxide.

It is to be understood from the foregoing that this invention contemplates a molding composition which is obtained by combining an anhydrous phosphoric acid, in which the phosphorus occurs in the pentavalent state and consisting of ortho phosphoric, pyrophosphoric, and mixtures intermediate thereof, and a metallic oxide capable of chemically reacting therewith in the absence of water of hydration or other water when the said acid is added in amounts of about 25 percent to about 75 percent by weight of the metallic oxide.

It will be understood from the above description that the bonding material may be used per se for the manufacture of sound, imporous, hard articles, and when this is done, it is unnecessary to interrupt the chemical reaction and grind the aggregate before molding since the chemical reaction may be allowed to proceed in the die until a molded product results. In general, when using a partially reacted bonding material made as above described, a temperature in the die of 250° F. to 400° F., and a pressure of 2.5 tons per square inch to 30 tons per square inch maintained for 5 minutes to one hour is sufficient. The time required under pressure and temperature varies with the mass of the piece with larger pieces requiring longer times. The molded product is then subjected to heat treatment of 1500° F. to 1700° F. to obtain the finished product.

The intermediate partially reacted powder is particularly useful when it is used as a binder for other materials such as iron powder, aluminum powder, brass and bronze powders, etc.

The method of this invention may be advantageously employed in the making of iron articles which conventionally are made by pressing iron powder and then sintering the pressed article. The addition of a suitable partially reacted phosphate binder, made as above described, has been found to reduce the pressure necessary to compact the powder and to improve the density, tensile, and compressive strengths of the sintered product above those obtained in a corresponding product made without the phosphate binder. Additionally, the phosphate powder increases the green strength after pressing and reduces processing difficulties which normally arise from oxidation of the powder. Consequently, iron powder containing oxide impurities in amounts greater than that which may be normally tolerated can be used in combination with a phosphate binder to produce sintered articles which are equally as desirable as those made with high purity iron powder in the absence of phosphate binder. For most purposes, approximately 2.5 percent phosphate binder admixed with the iron powder before molding has been found to be sufficient. Iron powder compacts subjected to pressures as low as 7.5 tons per square inch have improved green strength and may be handled without fear of crumbling prior to sintering. Sintering must, of course, be accomplished in a nonoxidizing atmosphere. Phosphates made from ferric and aluminum oxides are typical examples of suitable binders for this application.

For some electrical purposes or where unusual hardness is a factor, it is desirable to form articles of powdered silicon iron. This powder typically forms bridges when attempts are made to coalesce it by pressure without the addition of some bonding agent, and successful pressing is practically impossible. The addition of aluminum phosphate or iron phosphate, as described, makes the bonding of silicon iron under pressure readily feasible. After pressing the iron may be raised to the usual sintering temperature without impairing the strength of the finished article, but sintering temperatures reduce to some extent the electrical insulating effect produced by the phosphate binder. If it is desired to have the iron particles remain insulated from each other, the pressed article should be heated at a relatively low temperature on the order of about 350° F. This temperature has been found to produce a strong bond without breaking down the insulating effect of the binder.

The phosphate bonding powders described in relation to the bonding of iron powders as well as other phosphate bonding powders may be employed also for bonding brass, bronze, and other metal powders in a manner similar to that above described.

When employed with aluminum powder or other metallic powders which melt at a relatively low temperature, phosphate bonding powder, and especially aluminum phosphate made as described above, can be employed in a somewhat different manner. When a mixture containing 20 percent partially reacted aluminum phosphate, made as above described, and 80 percent pure aluminum powder is mixed and pressed without heat, the pressed article may be subsequently heated if desired beyond the melting point of aluminum without altering the shape of the pressed article. Upon heating, the aluminum phosphate forms a skeleton for the article which tends to maintain the shape, and the aluminum powder may be either sintered or melted as desired. An even better result has been obtained by employing 75 percent aluminum powder, 5 percent copper powder, and 20 percent aluminum phosphate and processed in the same manner.

Other aluminum base powdered alloys may be employed with improved results and with even less of the aluminum phosphate to form a skeleton. Two such aluminum alloys which have been used with good results are given by way of example.

ALLOY I

| | Percent |
|---|---|
| Aluminum | 91.5 |
| Tin | 6.5 |
| Nickel | 1 |
| Copper | 1 |

ALLOY II

| | Percent |
|---|---|
| Aluminum | 89.5 |
| Tin | 6.5 |
| Silicon | 2.5 |
| Copper | 1 |
| Nickel | .5 |

With alloys I and II as little as 15 percent of aluminum phosphate was found to form a satisfactory sustaining skeleton. Where it is not desired to raise the temperature to the actual melting point of the alloy, smaller amounts of aluminum phosphate may be employed on the order of about 5 percent to 10 percent.

The following specific formulae and procedures are given to illustrate several products which are useful for their special purposes. In the examples, the term acid is used to designate an acid composition of phosphorus, oxygen, and hydrogen corresponding approximately to the proportions of equal parts by weight of anhydrous orth-phosphoric acid ($H_3PO_4$) and pyrophosphoric acid ($H_4P_2O_7$). The designation of the asbestos is in accordance with the Canadian Asbestos Classification.

*Example 3*

180 grams vermiculite (125 mesh and finer)
100 grams ferric oxide
64 grams 5R asbestos
160 grams acid Successive portions of this mixture were pressed in a mold at room temperature and brought up to a temperature of 325° F. during 7 minutes, after which they were heated for 10 minutes at 300° F. The molding was done under a pressure of 2.5 tons per square inch.

Pieces molded in this way were boiled in water for 16 hours and then soaked in water for another 12 hours without any apparent material change. One of these pieces ¼ inch by 2¼ inches by 3 inches was subjected to a pressure of 7000 pounds applied to the 2¼ by ¼ inch edges with no failure of cross section.

*Example 4*

40 grams 5R asbestos
56 grams acid
40 grams vermiculite (200 mesh and finer)
30 grams $Fe_2O_3$ Pieces molded from this mixture under conditions similar to those used under Example 3 were thereafter heated to 1500° F. without distortion or loss of surface precision.

*Example 5*

160 grams fibrous asbestine
90 grams $Fe_2O_3$
30 grams calcium oxide
20 grams carbon black
140 grams acid The dry materials were mixed first and then the acid was mixed in for several minutes. Then the mixture was pressed several times between rolls spaced approximately .002 inch apart, which resulted in further distribution of the acid and produced a material which could be molded under heat and pressure to form a black product which was easily ejected from the die.

I claim:

1. In a method of forming a molding composition the steps of mixing at least one dry metallic oxide selected from the group consisting of aluminum oxide, ferric oxide, titanium oxide, chromium oxide, and manganese oxide with anhydrous phosphoric acid in the absence of water, said acid having a proportion therein of hydrogen, oxygen, and pentavalent phosphorous between the proportions in $H_3PO_4$ and $H_4P_2O_7$, inclusive, and being added in an amount between about 25 percent and about 75 percent by weight of the said oxide, heating the said mixture in the range of approximately 250° F. to 300° F. for approximately 5 minutes to one hour, cooling the said mixture and thereafter grinding the said mixture.

2. The method of forming a heat settable composition which comprises the steps of (1) uniformly admixing anhydrous phosphoric acid and a metallic oxide other than a metallic oxide which is highly reactive with said acid at room temperature, said phosphoric acid corresponding approximately to the proportion of equal parts by weight of anhydrous $H_3PO_4$ and anhydrous $H_4P_2O_7$, (2) heating the said mixture in the range of approximately 250° F. to 400° F. for approximately 5 minutes to one hour to obtain a partial chemical reaction, (3) interrupting the chemical reaction by cooling said mixture, (4) adding a dusting powder selected from the group consisting of magnesium oxide and magnesium carbonate, in the amount of approximately 2 percent to 5 percent by weight of the mixture, and (5) grinding the said mixture to the desired particle size.

3. The method of forming hard, heat-resistant, sound, imporous articles consisting essentially of the steps of (1) uniformly admixing anhydrous phosphoric acid with a dry metallic oxide other than a metallic oxide which is highly reactive with said acid at room temperature, said phosphoric acid corresponding approximately to the proportion of equal parts by weight of anhydrous $H_3PO_4$ and anhydrous $H_4P_2O_7$, (2) heating said mixture in the range of approximately 250° F. to 400° F. for approximately 5 minutes to one hour to obtain a partial chemical reaction, (3) interrupting the chemical reaction by cooling the said mixture, (4) adding to the said mixture a dusting agent selected from the group consisting of magnesium oxide and magnesium carbonate, and (5) grinding the said mixture to the desired particle size, (6) hot pressing the said mixture in a die at a temperature of approximately 250° F. to 400° F. under a pressure of approximately 2.5 tons per square inch to 30 tons per square inch, and (7) thereafter heat treating the said hot pressed article in the range of approximately 1500° F. to 1700° F.

4. The method of forming a heat-resistant, sound, imporous article which comprises uniformly admixing anhydrous phosphoric acid with a dry metallic oxide other than a metallic oxide which is highly reactive with said acid at room temperature, said acid corresponding approximately to an equal mixture by weight of anhydrous $H_3PO_4$ and anhydrous $H_4P_2O_7$ and being added in an amount of about 25 percent to about 75 percent by weight of the said oxide, and thereafter inserting the said mixture in a die and hot pressing the same at a temperature of approximately 250° F. to 400° F. under a pressure of 2.5 tons per square inch to 30 tons per square inch.

5. A method of forming a hard, heat-resistant, sound, imporous article which comprises mixing anhydrous phosphoric acid with at least one dry metallic oxide selected from the group consisting of aluminum oxide, ferric oxide, manganese oxide, titanium oxide, and chromium oxide, said acid corresponding approximately to an equal mixture by weight of anhydrous $H_3PO_4$ and anhydrous $H_4P_2O_7$ and being added in an amount of about 25 percent to about 75 percent by weight of said oxide, treating the mixture so that chemical reaction is temporarily interrupted, and thereafter molding the material by the simultaneous application of heat and pressure.

6. A material suitable for molding consisting essentially of a mixture of unreacted dry metallic oxide other than a metallic oxide which is highly reactive with said acid at room temperature and the chemical reaction products obtained by mixing anhydrous phosphoric acid and a dry metallic oxide in the absence of water, and containing a dusting powder selected from the group consisting of magnesium oxide and magnesium carbonate, said mixture being in the form of particles in a partially chemically reacted state and having a size within the range of about 60 screen mesh to about 300 screen mesh and being capable of further chemical reaction on the simultaneous application of heat and pressure whereby hard, heat resistant, sound imporous articles are formed.

7. A molding material consisting essentially of a mixture of unreacted dry metallic oxide and the chemical reaction products obtained by mixing anhydrous phosphoric acid with at least one dry metallic oxide selected from the group consisting of aluminum oxide, ferric oxide, manganese dioxide, titanium oxide, and chromium oxide, said acid having a proportion therein of hydrogen, oxygen, and pentavalent phosphorus between the proportions in $H_3PO_4$ and $H_4P_2O_7$, inclusive, and being added in an amount between about 25 percent and about 70 percent by weight of the said oxide, said mixture being in the form of particles, each particle being in a partially chemically reacted state and separated from each adjacent particle by an exterior layer of a dusting agent selected from the group consisting of magnesium carbonate and magnesium oxide and having a size within the range of about 60 screen mesh to about 300 screen mesh, said particles being further chemically reactive on the simultaneous application of heat and pressure to thereby form hard, heat resistant, sound imporous articles.

8. The method of making metallic articles which consists essentially of mixing a phosphate molding composition, said molding composition being obtained by mixing anhydrous phosphoric acid and a dry metallic oxide other than a metallic oxide which is highly reactive with said acid at room temperature and heating the mixture until a partial chemical reaction has taken place, and a metal powder selected from the group consisting of iron, aluminum, copper, and the alloys of which they constitute the chief ingredients, molding the said mixture, and thereafter subjecting the mixture to a temperature sufficient to sinter the same in a non-oxidizing atmosphere.

9. The method of making sound, imporous articles which consists essentially of mixing a phosphate molding composition with iron powder and the alloys thereof, said molding composition being obtained by mixing anhydrous phosphoric acid corresponding approximately to the proportions of equal parts by weight of anhydrous $H_3PO_4$ and anhydrous $H_4P_2O_7$ and a dry metallic oxide selected from the group consisting of ferric oxide and aluminum oxide and heating the mixture until a partial chemical reaction has taken place, molding the said mixture into a sound, imporous article, and thereafter subjecting the said article to a temperature sufficient to sinter the same in a non-oxidizing atmosphere.

10. The method of making sound, imporous articles which consists essentially of mixing a phosphate molding composition with aluminum powder and alloys thereof, said molding composition being obtained by mixing anhydrous phosphoric acid corresponding approximately to the proportions of equal parts by weight of anhydrous $H_3PO_4$ and anhydrous $H_4P_2O_7$ and aluminum oxide and heating the mixture until a partial chemical reaction has taken place, said mixture being in a proportion of 80 percent aluminum powder and 20 percent of the said phosphate molding composition, molding the said mixture into a sound, imporous article, and thereafter subjecting the said article to a temperature sufficient to sinter the same in a non-oxidizing atmosphere.

11. The method of making sound, imporous articles which consists essentially of mixing a phosphate molding composition with aluminum powder and alloys thereof, said molding composition being obtained by mixing anhydrous phosphoric acid corresponding approximately to the proportions of equal parts by weight of anhydrous $H_3PO_4$ and anhydrous $H_4P_2O_7$ and aluminum oxide and heating the mixture until a partial chemical reaction has taken place, said mixture being in a proportion of 75 percent aluminum powder, 20 percent of the said phosphate molding composition, and 5 percent copper, molding the said mixture into a sound, imporous article, and thereafter subjecting the said article to a temperature sufficient to sinter the same in a non-oxidizing atmosphere.

12. In a method for molding oxyphosphate cements wherein a metallic oxide is admixed with a bond containing the phosphoric acid radical, the improvement which comprises the steps of admixing a dry metallic oxide with an hydrous phosphoric acid having proportions of hydrogen, oxygen and pentavalent phosphorous between the proportions of orthophosphoric acid and pyrophosphoric acid inclusive, said oxide being one which is not highly reactive with said acid at room temperature heating the mixture in the range of 250° F. to 400° F. for a time sufficient to obtain a partial chemical reaction, interrupting the reaction, thereby forming a partially chemically reacted mixture, and thereafter simultaneously heating and pressing the said mixture under sufficient heat and pressure to form a hard heat-resistant, sound imporous article.

13. In a method for forming a heat settable composition wherein a metallic oxide is admixed with a bond containing the phosphoric acid radical, the improvement which comprises the steps of admixing a preliminary dried metallic oxide with an anhydrous phosphoric acid having proportions of hydrogen, oxygen and pentavalent phosphorus between the proportions in $H_3PO_4$ and $H_4P_2O_7$ inclusive, said oxide being one which is not highly reactive with said acid at room temperature heating the mixture in the range of approximately 250° F. to 400° F. for a time sufficient to obtain a partial chemical reaction between the said dry metallic oxide and the said phosphoric acid, interrupting the reaction thereby forming a partially chemically reacted mixture, adding a small amount of a dusting powder selected from the group consisting of magnesium carbonate and magnesium oxide and thereafter grinding the said mixture to the desired particle size.

14. A hard heat resistant, sound, imporous article consisting essentially of the polymerization product of the chemical reaction of an admixture of at least one dry metallic oxide selected from the group consisting of aluminum oxide, ferric oxide, manganese oxide, titanium oxide and chromium oxide and an anhydrous phosphoric acid having proportions of hydrogen, oxygen and pentavalent phosphorus between the proportions in $H_3PO_4$ and $H_4P_2O_7$ inclusive, the said polymerization reaction occurring under the simultaneous application of temperatures in the range of approximately 250° F. to 400° F. and pressures between about 2.5 tons per square inch to 30 tons per square inch.

References Cited in the file of this patent

UNITED STATES PATENTS

| Number | Name | Date |
|---|---|---|
| 412,793 | Reese | Oct. 15, 1889 |
| 1,736,909 | Frink | Nov. 26, 1929 |
| 2,091,569 | Ridgway et al. | Aug. 31, 1937 |
| 2,291,608 | Cobbs | Aug. 4, 1942 |
| 2,324,079 | Greger | July 13, 1943 |
| 2,405,884 | Greger | Aug. 13, 1946 |
| 2,460,344 | Greger | Feb. 1, 1949 |
| 2,465,645 | Greger | Mar. 29, 1949 |
| 2,538,867 | Greger | Jan. 23, 1951 |

FOREIGN PATENTS

| Number | Country | Date |
|---|---|---|
| 326,825 | Great Britain | 1929 |